Aug. 20, 1963 G. A. HEBERT 3,101,464
LOAD CELL
Filed Aug. 29, 1960
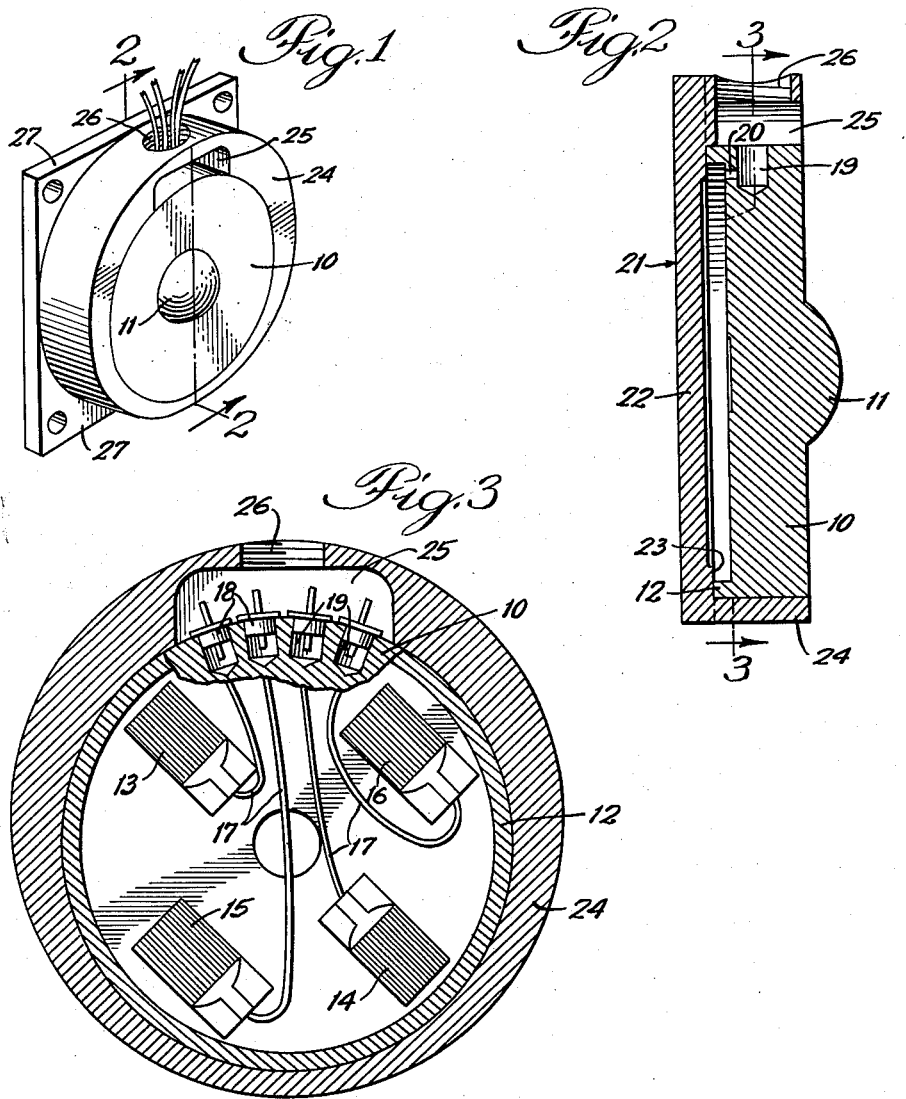
INVENTOR:
Gerald A. Hebert
BY
Bair, Freeman & Molinare
ATTORNEYS.

3,101,464
LOAD CELL

Gerald A. Hebert, Chicago, Ill., assignor, by mesne assignments, to Goodman Manufacturing Company, Chicago, Ill., a corporation of Illinois
Filed Aug. 29, 1960, Ser. No. 52,717
2 Claims. (Cl. 338—5)

This invention relates to load cells and more particularly to a load cell using electric strain gauges for weighing and other force measuring applications.

Load cells as heretofore constructed have generally been in the form of one or more columns having strain gauges bonded thereto and which are enclosed in a housing to be loaded in either tension or compression. For large capacity cells as used in such applications as railway car weighing, the physical size of the cell becomes quite large so that the cells are difficult to mount. The large size and particularly the column length also makes the cells sensitive to side loading and in conditions involving side loading a loss of accuracy is encountered. Furthermore, it has been very difficult to seal such cells against the ingress of moisture, particularly where they are subject to changing temperatures as in many typical scale installations. These several difficulties result in extremely high costs of load cells and in effectively prohibiting their use in many environments.

It is one of the objects of the present invention to provide a load cell which is extremely small and compact so that it is easily handled and installed, which is substantially insensitive to side loading and which can be easily and effectively sealed.

Another object is to provide a load cell in which the applied force is measured by applying it to the central part of a plate or disc which is supported at its periphery and utilizing strain gauges or similar strain measuring means secured to the disc to measure its deflection.

According to a feature of the invention the disc is supported and sealed in a cup-shaped base and the strain gauges are secured to the inner surface of the disc within the base.

The above and other objects and features of the invention will be more readily apparent from the following description when read in connection with the accompanying drawing, in which:

FIGURE 1 is a perspective view of a load cell embodying the invention with the sealing material omitted;

FIGURE 2 is an enlarged section on the line 2—2 of FIGURE 1; and

FIGURE 3 is a section on the line 3—3 of FIGURE 2.

The load cell as shown comprises essentially a disc 10 formed of high grade steel or similar material and which is supported at its periphery to deflect or dish slightly in response to a load applied in its central portion. For applying the load a raised spherical button 11 may be formed on the outer surface of the disc to receive a load transmitting member and to transmit the load thereof to the central part of the disc to cause it to deflect. In a typical scale installation, for example, the disc would be supported horizontally with the scale platform resting on the projecting buttons 11 of a plurality of similar load cells.

To support the disc at its periphery an annular supporting structure 12 is provided which, as shown, is formed integrally with the disc itself although this is not essential. In use, the disc is supported on the annular ring 12 so that its central portion can deflect in response to the applied force and the annular supporting ring can be formed accurately as to its thickness for complete uniformity between a plurality of discs. Furthermore, with this construction the capacity of the disc can be altered simply by cutting more or less deeply into its bottom in defining the ring 12 to leave a greater or less thickness of material in the disc itself.

For measuring the deflection of the disc measuring means in the form of conventional electric strain gauges are conveniently employed. As best seen in FIGURE 3, there are two pairs of strain gauges 13, 14 and 15, 16 with the gauges of each pair diametrically opposite to each other and secured to the bottom or inner surface of the disc between the center thereof and the annular supporting ring 12. The gauges 13 and 14 are active gauges and bonded to the surface of the disc in alignment with a diameter thereof while the gauges 15 and 16 are passive gauges and are bonded to the disc at right angles to a diameter thereof. The several strain gauges may be connected together in a conventional bridge circuit so that the inactive gauges 15 and 16 effect temperature compensation and are substantially unaffected by deflection of the disc while the active gauges 13 and 14 will be stretched as the disc is deflected to measure the strain therein. The gauges may be in the form of any desired type of standard commercial strain gauges and are bonded to the inner smooth surface of the disc in a conventional manner.

In order to connect the gauges into a measuring circuit they are connected through wires 17 to separate connector elements 18 which are received in short blind holes 19 formed in the periphery of the disc closely adjacent to each other. The wires extend to the connector elements through small holes 21 in the bottom of the disc which communicate with the blind holes 19. Any desired external wiring may be connected to the connector elements 18 to lead to any desired type of indicating, recording or controlling instruments.

The load cell is completed by a base indicated generally at 21 which is cup-shaped to receive the disc. The base has a flat bottom 22 which is preferably machined with a flat annular surface 23 at its periphery on which the annular ring 12 may rest. The bottom 22 is integrally secured to upstanding annular sides 24 which are of a size closely to receive the disc 10 to confine it accurately within the base with a minimum of space between the edges of the disc and the sides 24 of the base. The side wall of the base is preferably thickened at one side and is cut out to define a recess or cavity 25 into which the connectors 18 extend and with a threaded opening 26 opening into the cavity to receive an external threaded connector through which wiring may extend.

The disc may be assembled in the base by inserting it into the open top of the base as shown with the connectors lying in the cavity 25. After making the external wiring connections to the connectors 18, the cavity 25 may be filled with a sealing compound such as pitch or the like to prevent access of moisture to the connectors or the wiring. In a similar manner the joint between the periphery of the disc 10 and the side wall 24 of the base may be sealed by a sealing compound or by soldering or the like. In this way the cell is completely sealed against ingress of moisture or other foreign materials so that it can function properly even under adverse conditions.

For mounting, the base is preferably formed with corner extensions 27 formed with openings therethrough to receive mounting screws or similar fastenings. In use in an installation the base is secured rigidly in place on a supporting structure by fastenings extending through the openings in the corner sections and the force to be measured is applied to the upwardly projecting button 11.

Due to the present construction a load cell having a high capacity can be made in a very small size so that it not only occupies a minimum amount of space but so that it can be manufactured easily and inexpensively. In one typical load cell embodying the invention the disc has an outside diameter of 1.75" and a thickness of .312" with a capacity of 10,000 pounds. The over-all size of the base is 2⅛" with an over-all height of the assembly of ⅝". Due to the thinness of the load cell relative to the size of the base and to the manner in which the disc is supported in the base, side loads have little or no effect on the accuracy of the cell. Also due to its small size it can easily be installed in environments which prohibit the use of a conventional larger size load cell.

While one embodiment of the invention has been shown and described in detail, it will be understood that this is illustrative only and is not to be taken as a definition of the scope of the invention, reference being had for this purpose to the appended claims.

What is claimed is:

1. A load cell comprising a cupped base having a flat bottom and an annular upstanding side wall, a flat metal disc of uniform thickness fitting into the side wall and sealed thereagainst, annular supporting means engaging the bottom of the base and the periphery of the disc and holding the disc spaced from the base bottom, a central projection on the outer side of the disc to receive a force to be measured and apply it to the outer surface of the disc at the central portion thereof, and strain measuring means secured to the inner surface of the disc and lying in the space between the disc and the base bottom.

2. A load cell comprising a flat metal disc of uniform thickness, an annular supporting ring integrally secured to the peripheral portion of the disc at one side thereof and extending outward from the disc, a base having a flat bottom portion engaging the ring and held thereby in spaced relation to the disc, the base being sealed against the ring and disc to seal the space between the base and the disc, a central projection on the other side of the disc to receive a force to be measured and apply it to the outer surface of the disc at the central portion thereof, and strain measuring means secured to said one surface of the disc and lying in the space between the disc and the base.

References Cited in the file of this patent

UNITED STATES PATENTS

| | | |
|---|---|---|
| 1,865,446 | Sears | July 5, 1932 |
| 2,580,407 | Clark | Jan. 1, 1952 |
| 2,784,593 | Peucker | Mar. 12, 1957 |
| 2,927,292 | Critchley et al. | Mar. 1, 1960 |
| 2,979,680 | Bean | Apr. 11, 1961 |
| 2,992,556 | Webster | July 18, 1961 |